March 26, 1935.  J. H. ANDERSON  1,995,464
MEANS FOR DISTRIBUTING COTTON TO THE STALLS OF COTTON WAREHOUSES
Filed July 17, 1934  2 Sheets-Sheet 1
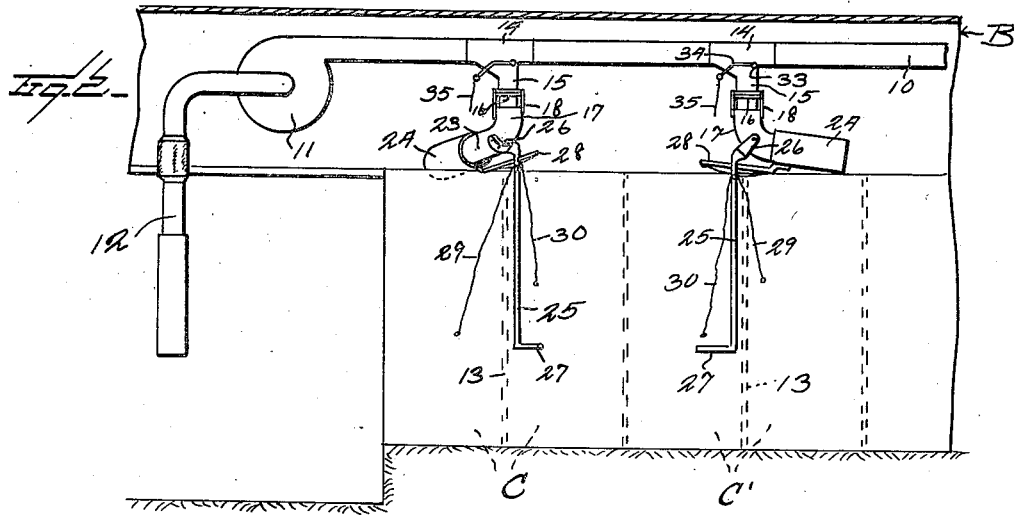
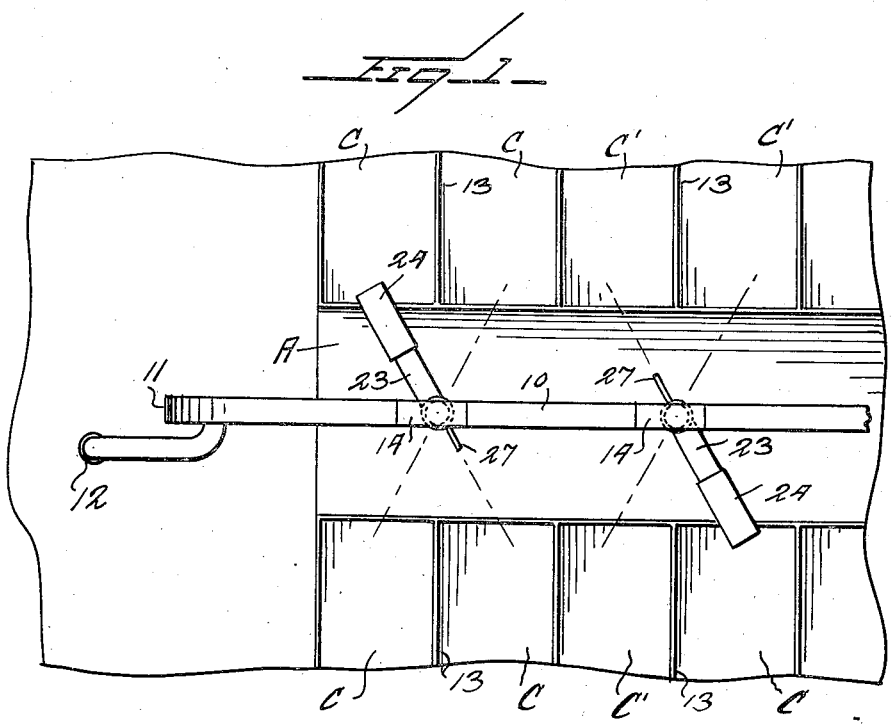
Inventor
J. H. Anderson
By Watson E. Coleman
Attorney

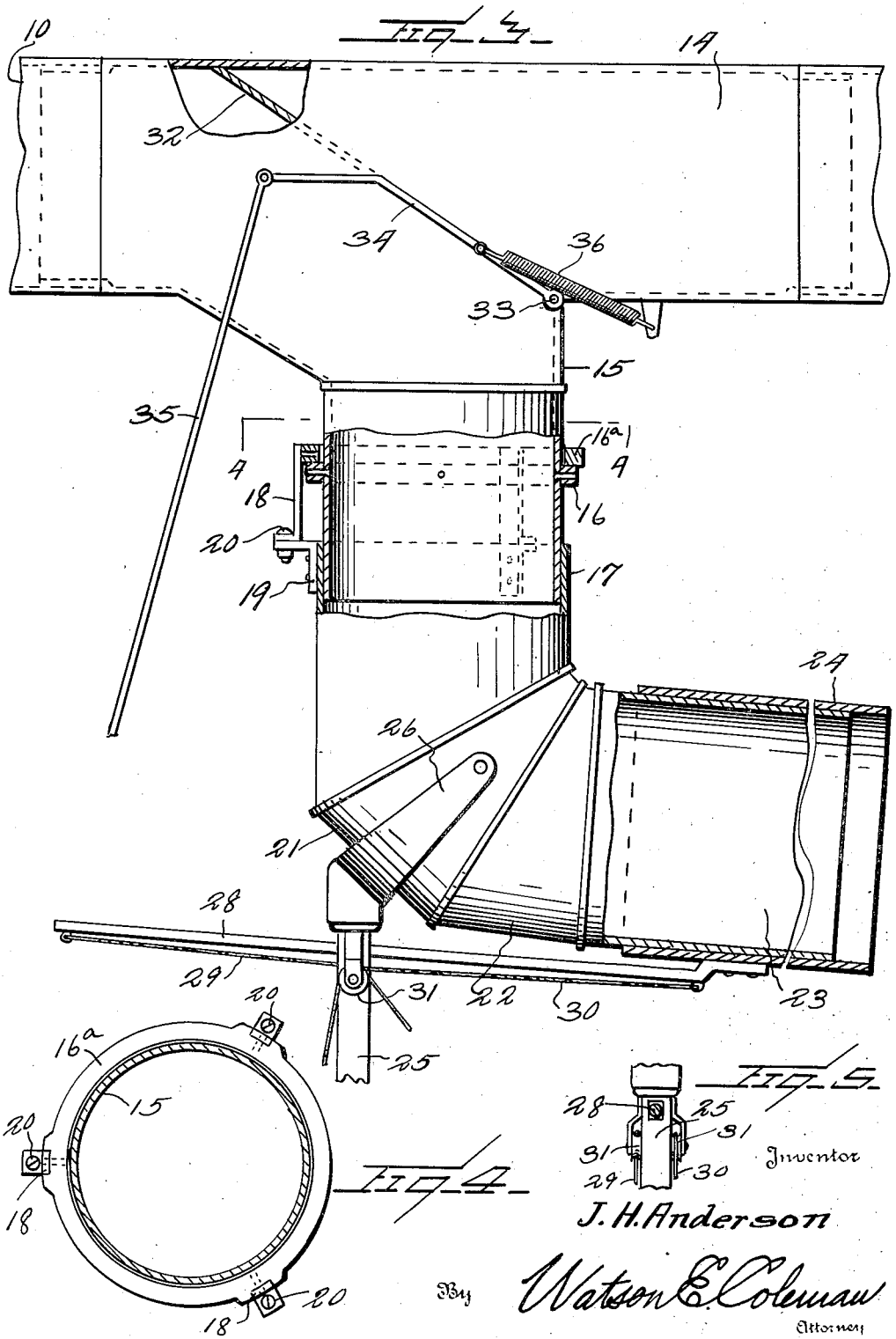

Patented Mar. 26, 1935

1,995,464

UNITED STATES PATENT OFFICE 1,995,464

MEANS FOR DISTRIBUTING COTTON TO THE STALLS OF COTTON WAREHOUSES

Joe H. Anderson, Chillicothe, Tex.

Application July 17, 1934, Serial No. 735,675

4 Claims. (Cl. 302—34)

This invention relates to distributing devices designed for the proper distribution of cotton after the same has been taken from wagons or trucks, and particularly to means whereby the cotton may be conveyed to the stalls of the warehouse by air.

The general object of my invention is to provide means connected to the conveyor pipe of this system whereby a plurality of stalls may be served from one branch elbow and a further object is to provide an elbow so constructed that it may be readily rotated through a complete circle to thus serve a plurality of stalls and so constructed that the extremity of the elbow may be shifted outward and downward so that the cotton may be discharged over the wall of said stall without the likelihood of the cotton being blown into the next adjacent stall.

A further object is to provide a swivel connection between the branch pipe and the main pipe which will not gather lint and thus required to be taken apart every now and then for cleaning, and which is further so constructed that the operator by moving the swivel connection may discharge any lint or other foreign matter that has gathered thereon.

Other objects will appear in the course of the following description.

My invention is illustrated in the accompanying drawings, wherein:—

Figure 1 is a fragmentary top plan view of a storage warehouse with my invention applied thereto.

Fig. 2 is a longitudinal sectional view through the housing showing my invention in elevation.

Fig. 3 is a side elevation of one of the cotton directing means for a plurality of stalls, parts being in section.

Fig. 4 is a section on the line 4—4 of Fig. 3.

Fig. 5 is a fragmentary detail elevation of the upper end of the operating rod.

Referring to the drawings and particularly Fig. 1, A designates the hall extending longitudinally thru a cotton house B, the house being divided on each side of the hall into stalls C. The hall may have any desired length and the stalls any desired size.

Each stall is designed to contain the cotton from one farmer. Extending longitudinally thru the hall and above the level of the cotton stall walls is a pneumatic conveyor or pipe designated 10. This is connected to a pneumatic blower designated 11, and receives its cotton from the pipe 12.

Disposed as shown in Fig. 1 at a point opposite the partition 13, between a pair of stalls, is a pipe section 14 forming part of the pipe 10. This has extending down from it a branch 15. Mounted on this branch 15 is a cast iron band 16. Disposed to surround the lower end of this branch 15 is a section 17 of an elbow. This section has mounted upon its upper end the upwardly extending brackets 18, the upper ends of these brackets being riveted, bolted, or otherwise attached to the metallic ring 16a supported on the band. The lower ends of these brackets are angularly bent and abut against angle irons 19, being attached thereto by screws or bolts 20. Thus it will be seen that the section 17 can rotate freely upon the section 15, and that the section 17 may move vertically with relation to the section 15, the section 15 telescoping within the section 17.

The lower end of the section 17 is cut on an angle and has attached thereto a segmental section 21, which in turn has attached thereto a second segmental section 22, and extending from this a cylindrical section 23.

Telescoping over this cylindrical section 23 is a longitudinally movable section 24, the sections 23 and 24 being normally extended outward and downward at a slight angle.

For the purpose of rotating the section 17 and the connected sections, I provide a downwardly extending rod 25 whose upper end is forked, at 26, to embrace the section 21. The lower end of the rod 25 is provided with a handle 27 extending downwardly to any convenient position whereby the section 17 may be rotated around its vertical axis. Attached to the telescopic section 24 is a rod 28 and connected to opposite ends of this rod are cords 29 and 30 passing over pulleys 31. By pulling on one or the other of these cords the section 24 may be longitudinally shifted either outward or inward.

It will thus be seen that the operator can turn the elbow so as to carry the elbow into position over any one of the four stalls C, and from Fig. 1, it will be seen that the operator can turn the next adjacent elbow so as to carry it over any one of the four stalls C', and so on, there being as many elbows on the pneumatic pipe 10 as there are sets of stalls. Likewise, it will be seen that after the extension 24 has been turned in position to discharge into the stall, it may then be shifted longitudinally so as to carry the cotton directly into the stall itself and eliminate any possibility of the cotton being accidentally discharged over the wall of any other stall.

Associated with each branch 15 is a valve 32 which is pivoted at 33. Exteriorly of the pipe section 14 and mounted upon the axis of the valve 33 is an arm 34, and from the end of this arm extends a valve controlling rod 35. When this rod is pulled downward, the valve 30 is closed across the opening of the branch 15. When the rod is pushed upward the valve 30 is carried up to the top of the pipe section 14 and acts to deflect any cotton passing into the pipe section downward into the branch 15 and elbow.

For the purpose of holding this valve in either of its two positions, I provide a spring 36 which is attached to the arm 34 just beyond the pivot thereof. This spring is so arranged in a well-known manner, that it exerts a retractile force when the valve is turned to its closed or to its open position, either one, the spring acting as it passes its dead center to urge the valve into one position or the other.

With the construction which I have described I am able to handle cotton in much longer houses, as for instance, in a house of sixteen stalls. In such a system I would use only four branches and elbows, with corresponding valves, whereas other systems known to me would use sixteen, or a valve for each stall. My construction is very easily set up for any desired stall as the control lever from the elbow extends low enough for the operator to turn from the floor, and by means of this control lever he can raise the movable elbow up a distance of approximately three inches from the top of the movable ring 16a to the cast iron ring 16, and as he raises this elbow all lint or dirt is released from the swivel. The elbow section 22 is of such length that it extends within approximately four inches of either longitudinal partition defining the hallway A, and as the telescopic section 24 is capable of being pulled back even with the end of the pipe section 23 it is obvious that the elbow may be rotated freely so as to be directed toward anyone of the stalls C. The operator turns the elbow towards the stall to be filled, then by means of the control cords 29 he extends this section 24 over the wall of the stall into the top of the stall to be filled and it is impossible for this elbow to be accidentally moved and thus get into an adjoining stall thereby mixing the customer's cotton. This is a very valuable feature, as the blast of air used to deliver the cotton has a tendency to move this elbow from place to place. This cotton distributing system has been installed in a number of cotton houses and has given extreme satisfaction because of the ease with which it may be controlled and the certainty that the cotton may be discharged into the desired stall without any liability of mixing. The ability to lift up on the elbow so as to discharge any lint that may accumulate between the elbow and the branch pipe 15 is a valuable feature because these elbows would otherwise very likely become clogged up by flying lint and other foreign matter, making it difficult to turn the elbow.

While I have illustrated certain details of construction and certain arrangements of parts, I do not wish to be limited to this exact construction or arrangement, as it is obvious that many changes might be made in the details of construction without departing from the spirit of the invention as defined in the appended claims.

I claim:

1. In means for distributing cotton to the stalls of cotton warehouses, a pneumatic conveying pipe extending longitudinally midway between the stalls, a branch pipe extending downwardly therefrom, an elbow swiveled to the branch pipe for swinging movement in a horizontal plane and having a downwardly inclined cower portion, an extension pipe telescopically mounted upon an extremity of the elbow, a handle whereby the elbow may be rotated upon the branch pipe thru a complete circle, means connected to the telescopic extension whereby the telescopic extension may be projected or retracted relative to the elbow and a valve disposed in the pneumatic pipe immediately above the branch pipe and movable into or out of position deflecting cotton into the branch pipe.

2. In means for distributing cotton to the stalls of cotton warehouses, a pneumatic conveying pipe extending longitudinally between the stalls, a branch pipe extending downwardly therefrom, an elbow swiveled to the branch pipe, an extension pipe telescopically mounted upon an extremity of the elbow, a handle whereby the elbow may be rotated upon the branch pipe thru a complete circle, means connected to the telescopic extension whereby the telescopic extension may be projected or retracted relative to the elbow, a valve disposed in the pneumatic pipe and movable into position deflecting the cotton into the branch pipe or closing the opening of the branch pipe, manually operable means for shifting said valve, and resilient means yieldingly holding the valve in either of its shifted positions.

3. In means for distributing cotton to the stalls of cotton warehouses, a pneumatic conveying pipe extending longitudinally between the stalls, a branch pipe extending downwardly therefrom and having a ring exteriorly applied thereto, an elbow telescoping over the branch pipe, and a plurality of brackets detachably engaged to the elbow and extending upward therefrom and over the periphery of the ring, a ring carried by said brackets and normally resting upon the first named ring, and a handle operatively connected to the elbow and extending downward therefrom whereby the elbow may be rotated upon its vertical axis or shifted upward to raise the ring carried by the elbow above the ring mounted upon the branch pipe.

4. In means for distributing cotton to the stalls of cotton warehouses, a pneumatic conveying pipe extending longitudinally between the stalls, a branch pipe extending downwardly therefrom and having a ring exteriorly applied thereto, an elbow telescoping over the branch pipe, a plurality of brackets detachably engaged to the elbow and extending upward therefrom and over the periphery of the ring, a ring carried by said brackets and normally resting upon the first named ring, a handle operatively connected to the elbow and extending downward therefrom whereby the elbow may be rotated upon its vertical axis or shifted upward to raise the ring carried by the elbow above the ring mounted upon the branch pipe, an extension pipe telescoping over one end of the elbow, a rod attached thereto and extending in an approximately horizontal plane, and pull cords attached to opposite ends of the rod whereby the rod may be shifted to shift the extension pipe longitudinally upon the extremity of the elbow.

JOE H. ANDERSON.